United States Patent
Simons et al.

(10) Patent No.: US 6,968,259 B2
(45) Date of Patent: Nov. 22, 2005

(54) MONITORING AND ANNUNCIATION DEVICE FOR EQUIPMENT MAINTENANCE

(75) Inventors: S. Brian Simons, Trumbull, CT (US); Samuel R. Simons, Monroe, CT (US); Kenneth R. Frost, Shelton, CT (US); Kenneth J. Pontbriant, Shelton, CT (US)

(73) Assignee: OEM Controls, Shelton, CT (US)

( * ) Notice: Subject to any disclaimer, the term of this patent is extended or adjusted under 35 U.S.C. 154(b) by 125 days.

(21) Appl. No.: 10/461,758

(22) Filed: Jun. 13, 2003

(65) Prior Publication Data

US 2004/0002798 A1    Jan. 1, 2004

Related U.S. Application Data

(60) Provisional application No. 60/392,997, filed on Jun. 28, 2002.

(51) Int. Cl.[7] .............................................. G06F 7/00

(52) U.S. Cl. ....................................... 701/30; 702/184

(58) Field of Search .................... 701/30, 29; 702/184, 702/183

(56) References Cited

U.S. PATENT DOCUMENTS

| | | | |
|---|---|---|---|
| 6,172,602 B1 * | 1/2001 | Hasfjord | 340/438 |
| 6,542,074 B1 * | 4/2003 | Tharman et al. | 340/457.4 |
| 6,587,768 B2 * | 7/2003 | Chene et al. | 701/33 |
| 6,601,442 B1 * | 8/2003 | Decker et al. | 73/117.3 |
| 6,721,685 B2 * | 4/2004 | Kodama | 702/184 |
| 2003/0001736 A1 * | 1/2003 | Lewix | 340/457 |
| 2003/0152088 A1 * | 8/2003 | Kominami et al. | 370/401 |

OTHER PUBLICATIONS iSite Get Down to Business, Published on the Internet. (Date unknown.).
"Predictive Analysis Through Wireless Connectivity," Predictive Online Devices, Inc., published on the Internet. (Date unknown.).
Zonar Systems, published on the Internet, info@zonarsystems.com. (Date unknown.).
Turf Centric, Inc., published on the Internet, 2002.
Production Process, published on the Internet. (Date unknown.).
AirIQ, published on the Internet, 2002.
Fuel-All, published on the Internet. (Date unknown.).
FleetBoss, Global Positioning Solutions, published on the Internet, 2003.
SenDEC Corporation, published on the Internet, 2001.
CS2 Inc., published on the Internet, 2002.
1 2 3 Vehicle Tracking, published on the Internet. (Date unknown).

* cited by examiner

Primary Examiner—Thomas G. Black
Assistant Examiner—Christine M. Behncke

(57) ABSTRACT

A system (10) that can be used to retrofit any machine (15) for indicating when to perform maintenance service tasks for the machine (15). It includes a service tracker (12) connected to the machine (15), and also a maintenance manager (14) typically hosted by a hand-held device and coupled to the service tracker (12) by a wireless link (12a 14a 16), so as to allow providing a service interval for each of typically several tasks. For each of the tasks, a timer (42a), preferably resettable via the maintenance manager (14), is provided as part of the service tracker (12), allowing direct comparison of a service interval for a task with the reading of the corresponding resettable timer (42a). Based on the direct comparison of service interval and resettable timer reading for a task, the service tracker (12) provides a service warning via a display (12d) when it is time to perform the task again.

25 Claims, 3 Drawing Sheets

MONITORING AND ANNUNCIATION DEVICE FOR EQUIPMENT MAINTENANCE

CROSS REFERENCE TO RELATED APPLICATION

Reference is made to and priority claimed from U.S. provisional application Ser. No. 60/392,997, filed Jun. 28, 2002, entitled MAINTENANCE MONITORING, LOGGING, AND ANNUNCIATION DEVICE FOR AN INTERCONNECTED VEHICLE.

FIELD OF THE INVENTION

This invention generally relates to service tracking systems for various types of machine equipment and more specifically to monitoring, logging and annunciation of equipment periodic maintenance service.

BACKGROUND OF THE INVENTION

Periodic service maintenance of machine equipment is important for keeping the equipment operational and maximizing its life time. Keeping track of periodic maintenance services manually is difficult and expensive, especially in industrial and construction environments where the machines could be used by different operators for different tasks. Therefore, it would be very useful to have an automatic alert system, which would remind the machine operator when a particular maintenance service for an application specific parameter should be performed. Such a system should be capable of monitoring multiple periodic service intervals and issuing service warnings corresponding to these service intervals. Such an automatic system should provide, but not be limited to, reducing over-service cost and service downtime, simplifying service record handling, and increasing machine resale value.

SUMMARY OF THE INVENTION

Accordingly, in a first aspect of the invention, a service tracking system is provided for use with a machine having an engine or motor assembly, the service tracking system for warning when a maintenance procedure for a service maintenance task is to be performed, comprising: a maintenance manager, responsive to a service interval setting command, for providing a corresponding service interval setting signal indicating a service interval for the service maintenance task; and a service tracker, retrofittably attached to the machine, responsive to the service interval setting signal, and further responsive to a machine operating status signal provided by a coupling to the engine or motor assembly, for issuing a service warning urging that the service maintenance task be performed as soon as possible; wherein the service tracker includes a resettable timer (42a) having a timer count value indicating a timer reading useable for determining when to issue the service warning, and the service tracker is responsive to a timer reset signal for resetting the resettable timer so as to allow comparing the resettable timer reading with the service interval.

In accord with the first aspect of the invention, the resettable timer may reset to a value of zero in response to the timer reset signal so as to allow directly comparing the resettable timer reading with the service interval.

Also in accord with the first aspect of the invention, the service tracking system may further comprise a non-resetting total timer adapted to advance whenever the resettable timer advances and providing a total timer reading, and further wherein the resettable timer may be reset to the total timer reading in response to the timer reset signal at the time the reset signal is received so as to allow comparing the resettable timer reading at a current time with the service interval after subtracting the resettable timer reading from the total timer reading at the current time.

Also in accord with the first aspect of the invention, the maintenance manager and service tracker may be coupled by a wireless link. Further, the wireless link may convey an infrared signal, or the wireless link may convey a radio frequency signal.

Also in accord with the first aspect of the invention, the maintenance manager may be hosted by a hand-held device, which may be a personal digital assistant type of device.

Also in accord with the first aspect of the invention, the machine operating status signal may convey information about the speed of operation of a component of the engine or motor assembly, and the service tracker module may be adapted so that the resettable timer advances its timer count value only when the speed of operation is at least a predetermined minimum speed setting.

Also in accord with the first aspect of the invention, the machine operating status signal may convey information indicating whether a component of the engine or motor assembly is on, and the service tracker module is adapted so that the resettable timer advances its timer count value whenever the component of the engine or motor assembly is indicated as being on.

Also in accord with the first aspect of the invention, the maintenance manager may be responsive to a timer reset command corresponding to the timer reset signal provided via a user interface, and may provide the corresponding timer reset signal.

Also in accord with the first aspect of the invention, the service tracker may comprise a direct timer reset means, responsive to a direct timer reset command, for providing the timer reset signal.

Also in accord with the first aspect of the invention, the service tracker may comprise a data store for storing a log of maintenance service. Further, the maintenance manager may include means for responding to a request for providing the log of maintenance service provided via a user interface and for providing a corresponding request to the service tracker, and for responding to a signal from the service tracker conveying the maintenance log and for then providing the maintenance log. Also further, the maintenance manager may provide the maintenance log so as to be downloadable to a personal computer database.

Still also in accord with the first aspect of the invention, the service tracker may include a display (12d) for indicating all or part of the service warning. Further, the service tracker may provide at least two service warning signals simultaneously, corresponding to at least two service interval settings, and further may alternately display on the display at least two service warning code numbers corresponding to the at least two service warning signals.

In a second aspect of the invention, a method is provided for monitoring maintenance service for a machine having an engine or motor assembly, the method characterized by: a step of using a hand-held device to provide at least one service interval via a wireless link (16) to a service tracking module retrofittably attached to the machine and electrically coupled to a component of the engine or motor assembly; and a step of issuing at least one service warning signal based on comparing the service interval with a reading of a resettable timer included in the service tracking module.

In accord with the second aspect of the invention, the hand-held device may be a personal digital assistant type of device.

Also in accord with the second aspect of the invention, the method may further comprise: a step in which the resettable timer is reset via a user interface hosted by the hand-held device.

Also in accord with the second aspect of the invention, the method may further comprise: a step in which the resettable timer is reset via a direct reset means hosted by the service tracking module.

BRIEF DESCRIPTION OF THE DRAWINGS

For a fuller understanding of the nature and objects of the present invention, reference is made to the following detailed description taken in conjunction with the following drawings, in which.

BEST MODE FOR CARRYING OUT THE INVENTION

Figure 1:
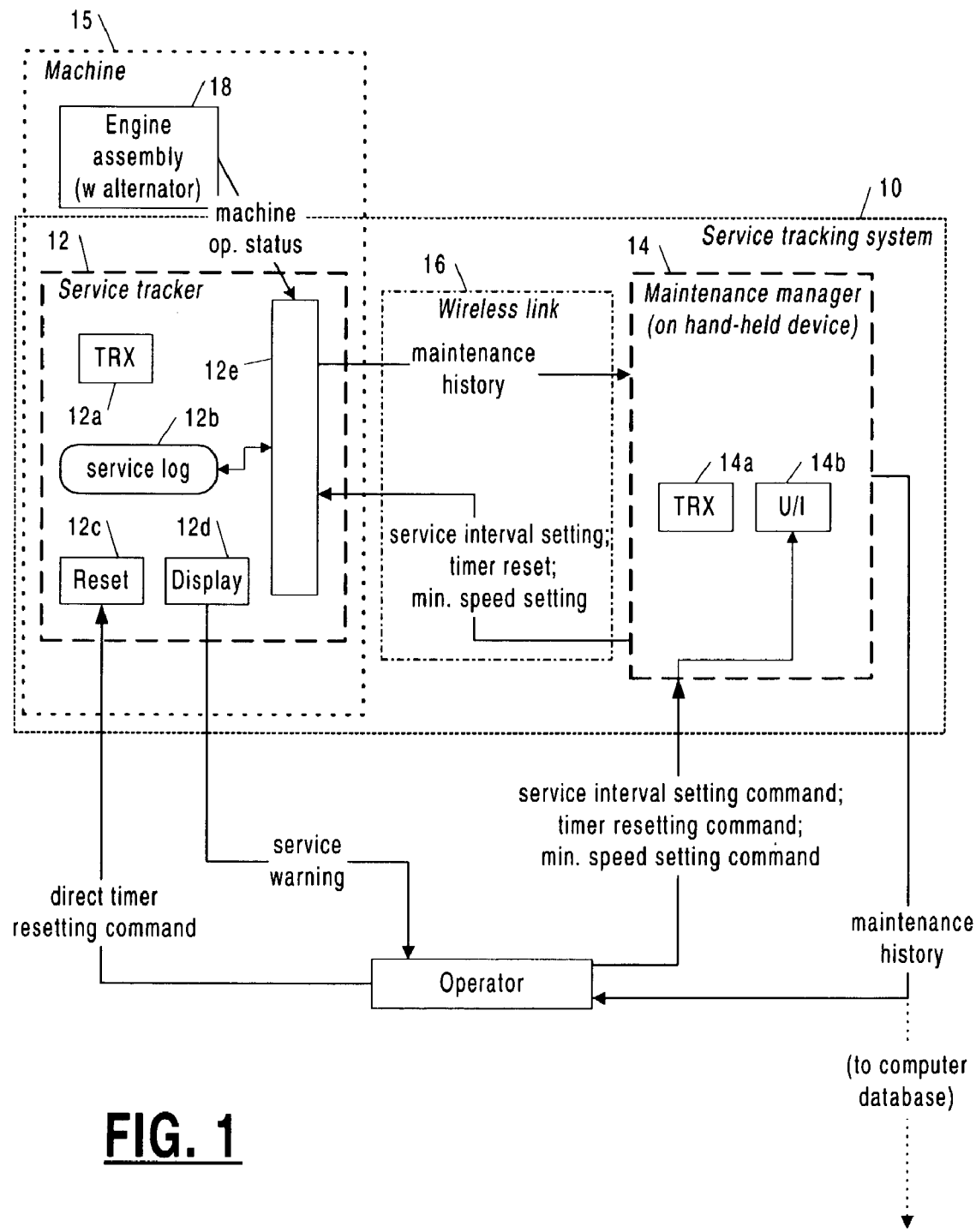
FIG. 1 is a block diagram of a service tracking system according to the present invention, including a maintenance manager module and a service tracker module, which in turn includes a service tracker controller.

Referring now to FIG. 1, the invention provides a service tracking system 10 for tracking when to perform service maintenance tasks for a machine 15 having an engine or motor assembly 18 including an engine and possibly including an alternator. The service tracking system 10 includes two main components: a service tracker (ST) module 12, including in a controller 12e timers 42a (FIG. 2) for respective tasks and including a display 12d or other means of issuing a service warning, i.e. of annunciating an indication that it is time to perform one of the service maintenance tasks, and so urging that the service maintenance task be performed as soon as possible; and a maintenance manager (MM) module 14, for setting the service interval for each of the tasks (i.e. for setting for a task the machine operating time that is to accumulate before the next performance of the task), and for resetting the timer 42a (FIG. 2) for a task after the task is performed. The service tracker 12 is electrically connected to one or another component of the engine or motor assembly 18 of the machine 15, such as a machine operation switch, so as to sense when the machine is operating, via a machine operating status signal (such as an on/off state signal) provided by the machine operation switch. The machine operation switch can be, for example, a pressure switch or an ignition switch. The MM module 14 is preferably hosted by a hand-held computer device—such as a personal digital assistant type of device as described for example at the web site:

http://www.howstuffworks.com/pda.htm, or a device based on a personal digital assistant type of device—and communicates with the ST module 12 (also hosted by a computer device, but one attached to the machine 15) via a wireless link 16, such as by an infrared signal or a radio frequency signal. The link 16 is provided by a transceiver (TRX) 12a in the ST module 12 and a transceiver 14a in the MM module 14; the ST TRX 12a and the MM TRX 14a each include an antenna (and, in case of infrared, a data transfer window) necessary for transmission and reception of signals of the type used. (In case of an infrared link, it is of course necessary to attach the ST module 12 to the machine 15 so that the data transfer window of the ST transceiver 12a is in a possible line of sight to the MM transceiver 14a.)

Still referring to FIG. 1, except in case of receiving a service warning and in case of a direct timer reset, an operator interfaces with the service tracking system 10 via a user interface (U/I) module 14b of the MM module 14, providing a new or changed service interval (which can be done at any time, for any task), a command to reset a timer (a timer resetting command) for a respective service maintenance task, and viewing service maintenance history/logs. The operator interface with the ST module 12 includes, preferably, a (direct) reset button 12c allowing a direct timer reset, and the display 12d (for indicating in case of a service warning which task is to be performed). The reset button 12c allows an operator to directly reset (as opposed to using the MM module 14 to reset) the timer 42a (FIG. 2) associated with a predetermined one of the various service maintenance tasks, usually a task that must be performed relatively often. Although there is typically only a single reset button 12c, which is therefore associated with a single, special task, it is of course possible to have more than one reset button, each associated with a different, relatively high repetition task.

Figure 2:
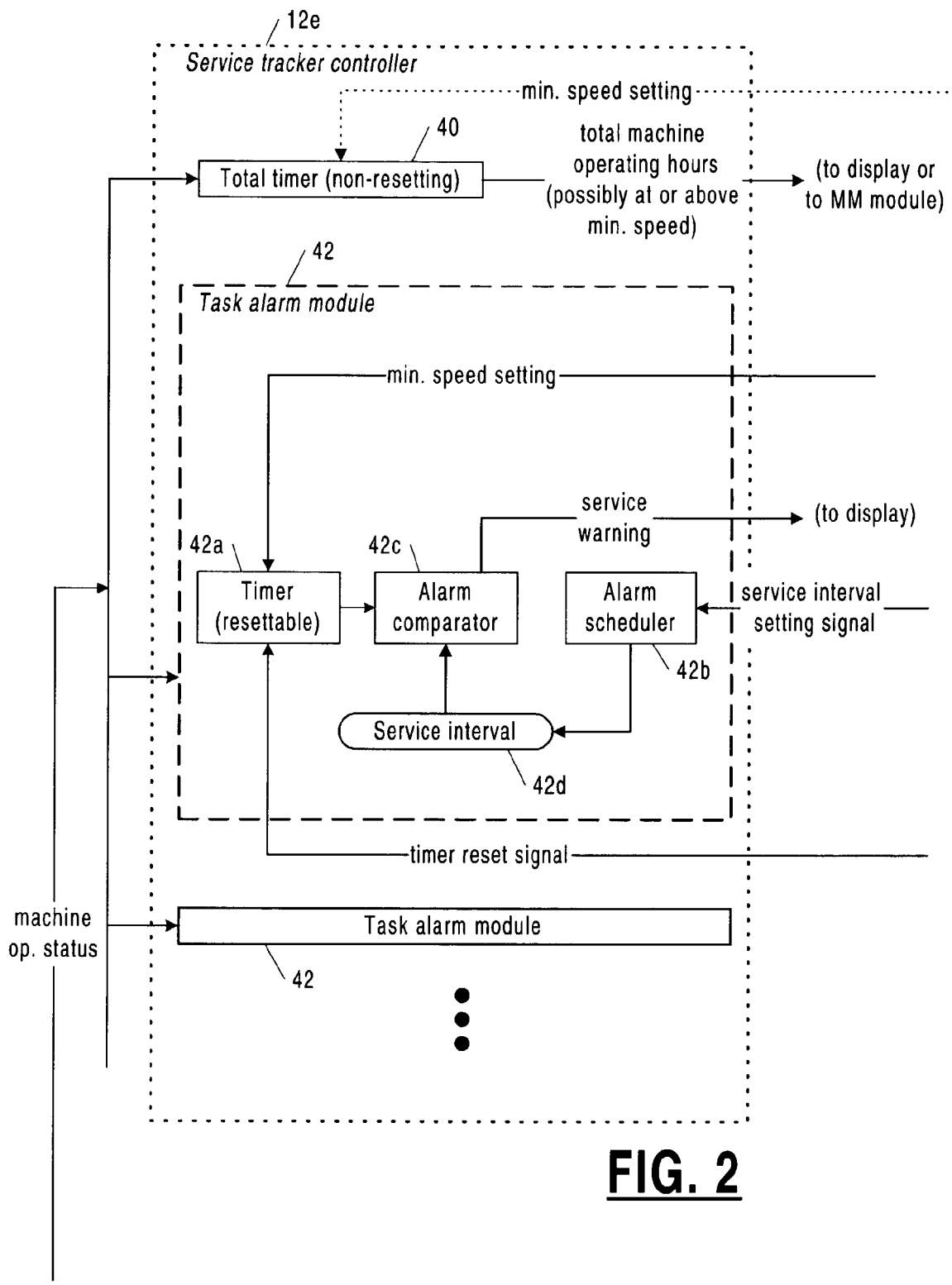
FIG. 2 is a block diagram representation of the service tracker controller of FIG. 1.

Referring now also to FIG. 2, the service tracker controller 12e includes a total timer 40—non-resetting, i.e. not responsive to reset signal—for providing an indication of the total machine operating hours (or total time above a minimum operating speed, as described below), and also includes, as mentioned above, one or more resettable timers 42a, each for keeping track of when to perform an associated maintenance service task (such as changing engine oil, changing cooling liquids, changing various filters, etc.). For embodiments in which the machine operating status signal is simply a machine on/off state signal, and so for embodiments in which the service tracking module 12 is coupled to a machine operation switch, the machine on/off state signal (which could be a toggle signal) activates/deactivates both the total timer 40 as well as all of the one or more resettable timers 42a. Each resettable timer 42a indicates a timer reading useable for determining when to issue the service warning for the associated task. Each resettable timer 42a can be either reset to zero, allowing the timer reading to be compared directly with the service interval, or, alternatively, each resettable timer can be reset to the current total timer reading indicated by the total timer 40, in which case to determine when to issue a service warning for a task, the task resettable timer reading is periodically subtracted from the current total timer reading (provided by the total timer 40) and the result compared with the service interval for the task.

Each resettable timer 42a is preferably implemented as a combination of an executable module and an associated data store where the current count of the timer is stored. To advance its timer count value, each resettable timer uses as an input a signal derived from a pulse provided (ultimately) by a single oscillator (not shown) included as part of the microprocessor (not shown) hosting the service tracker module 12 (and so hosting the executable module implementing the resettable timer 42a). The coupling of each resettable timer to the oscillator may be indirect, via an operating system hosted by the microprocessor, or may be a direct coupling. The single oscillator preferably regulates the advance not only of each resettable timer, but also that of the total timer 40.

In the preferred embodiment, each resettable timer advances only during periods when the engine of the machine is operating at normal operational speed, as opposed to simply idling. In such embodiments, to allow setting a minimum speed that may be different for different tasks, each resettable timer 42a includes a data store (not shown) holding a (resettable) minimum engine speed value and each is programmed not to advance unless the engine speed exceeds the minimum engine speed. The engine speed is indicated to the resettable timer 42a, in case of a machine including an alternator, by for example using a sensor coupled to the alternator to detect the engine speed. In case of a machine including a tachometer, a signal may be derived to indicate engine speed by coupling to the alternator input or output. In any case, in such embodiments the machine operating status signal is a signal provided to the resettable timer 42a via a coupling to one or another component of the engine or motor assembly 18 and indicating the engine speed, and the resettable timer is programmed to advance only while the engine speed exceeds the minimum engine speed stored in the minimum engine speed data store. In case of applications where all the resettable timers should be advanced based on a single minimum engine speed setting, it is sufficient to have only a single data store to which all resettable timers 42a refer, where only a single minimum engine speed setting is stored. In some applications, the service tracker can include two sets of resettable clocks, one for recording accumulated on time since last performing respective service tasks, and another set for recording accumulated operating speed time since last performing the same respective service tasks. In case all of the resettable (task) timers 42a use the same minimum operating speed, the total timer 40 is adapted to advance (increment the count value it stores) at the same rate as the resettable timers 42a. In case of embodiments in which the resettable (task) timers 42a use different minimum operating speeds, the total timer 40a can be adapted to increment whenever the engine is on, or it can be provided with its own minimum operating speed figure, and adapted so as to increment only when it receives a machine operating status signal indicating an operating speed at least equal to its minimum operating speed figure.

Still referring to FIG. 2, each resettable timer 42a is combined with at least one alarm scheduler 42b and at least one alarm comparator 42c to form a timer alarm module 42 for keeping track of the maintenance service associated with the resettable timer 42a. As explained below, each timer alarm module 42 receives (ultimately from an operator) and stores a service interval indicating how often (how long to wait, in machine operating hours) to perform the associated service maintenance, and receives (ultimately from the operator, at or near the time the associated service maintenance is actually performed) a command to reset the resettable timer 42a included in the timer alarm module 42. The service interval can be changed at any time, but is usually set as recommended by the manufacturer of the machine 15. A command to set (or reset/change) a service interval is directed (by an operating system, not shown) to the alarm scheduler 42b, which stores it (possibly overwriting an existing service interval) in a data store 42d. The alarm comparator 42c periodically compares the service interval in the data store 42d with the time of operation (since last reset) indicated by the resettable timer 42a, and when the time of operation equals or exceeds the service interval, the comparator issues a service warning signal. The service warning signal can be communicated by the controller 12e to an operator in various ways. Typically, the service warning is provided as a visual warning via the display 12d, and indicates which task is to be performed. Alternatively, the service tracker can produce an audible service warning, either a sound that can be identified with the service maintenance to be performed, or a sound that serves as a general caution that a service maintenance task is to be performed, and the operator is advised to look at the display 12d to learn which task should be performed. After the service tracker 12 issues a service warning for a service maintenance task, the operator can reset the associated timer 42a, and does so via the maintenance manager 14, or, in some cases (typically a relatively high frequency service maintenance task), using the direct reset feature executed by depressing the reset button 12c on the housing for the service tracking system.

As explained, when it is time for a service task to be performed, the timer alarm module 42 issues an annunciation, i.e. a service warning signal corresponding to a service interval set by the maintenance manager 14. A service warning annunciation can be implemented in a variety of ways. It can be, for example, a sound alarm with a different number and/or duration of sound signals for different service warnings. The service warnings can be also displayed on multiple displays or on at least one display 12d of the service tracker 12, e.g., an LED display. Different warning code numbers can be used on the display to indicate different types of service warnings. If two or more service warning signals are issued simultaneously corresponding to two service interval setting signals, then two or more service warning code numbers associated with each service warning signal are periodically displayed on the display of the service tracker 12. Also different displays on the service tracker 12 can be used to display warnings for different types of maintenance services: for example, more frequent service with a short service interval can have a separate display, according to the present invention.

The service tracker 12 has a data store 12b (in a memory device not shown) for storing a history/log of maintenance service. The maintenance history/log typically includes the total number of operation hours of the machine 15, a chronology of on/off hours of machine 15 (in some embodiments, the on hours indicating operation only at or above the minimum speed setting, as described above), a log of the service warnings, issues a timer resetting lot, a number of fuel gallons used, etc. Via the (MM-hosted) user interface 14b, which typically includes a display (not shown) and a keypad (not shown), an operator can ask to view the maintenance log, or, alternatively, have the maintenance log downloaded through a standard port to a personal computer database, for further processing, analysis, storage and printing. In some embodiments of the invention, the date and time when the machine 18 turns on and off is recorded in a log (such as the service log 12b or some other log, not shown) in the service tracker 12. The moment when the machine 18 turns on and off is signaled by the electrical connection to the engine or motor assembly 18, and the corresponding date and time is provided by a continuously running clock, such as the non-resetting total timer 40.

Figure 3:
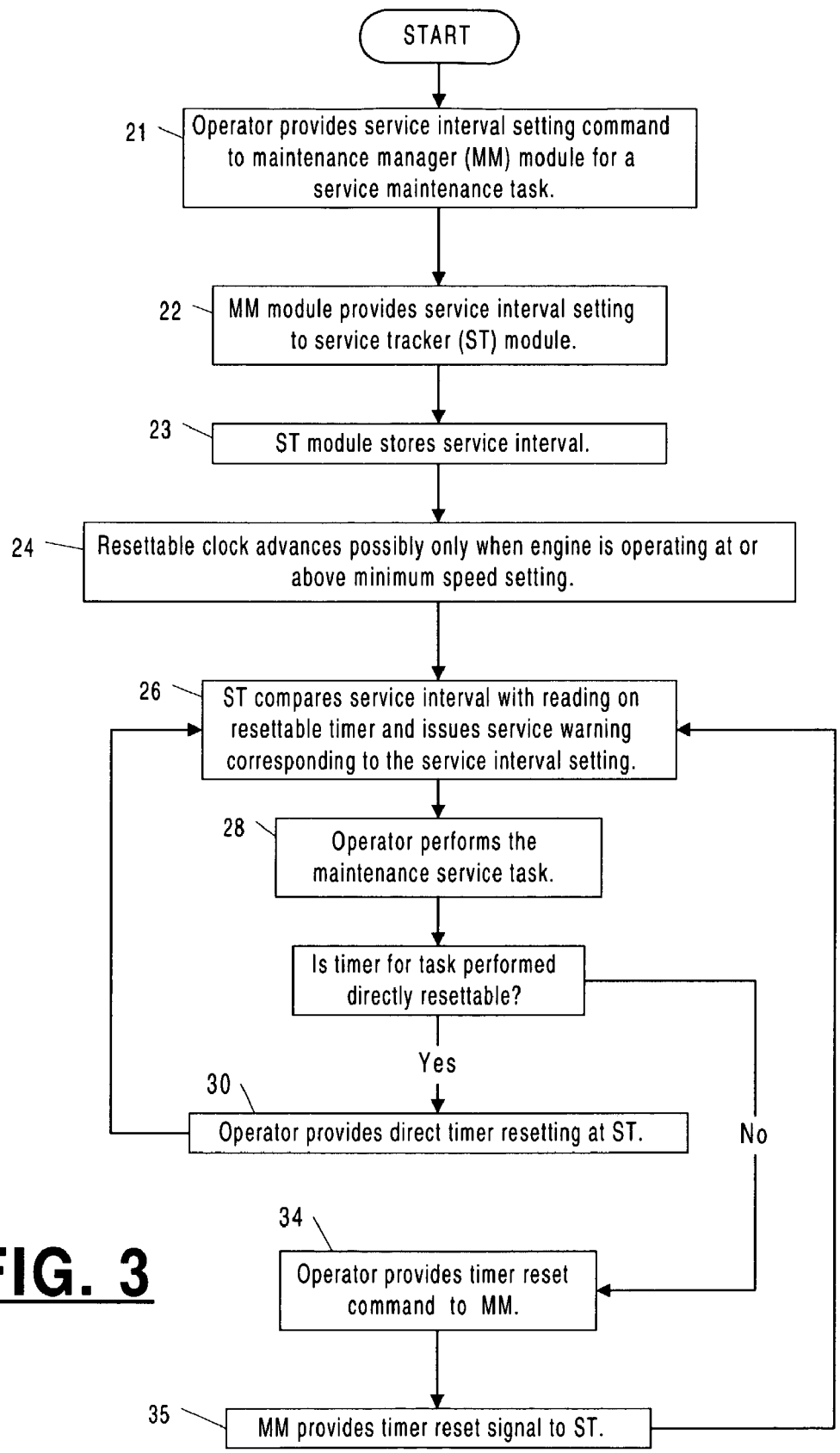
FIG. 3 is a flow chart indicating a sequence of steps in the use of the service tracker system of FIG. 1.

Referring now to FIG. 3, operation of a service tracker system 10 according to the invention is shown as including, in one possible scenario, a first step 21 in which an operator sets a service interval for a task by providing a service interval setting command via the use of interface 14b of the MM module 14. In a next step 22, the MM module 14 provides a corresponding service interval setting signal to the ST module 12. In a next step 23, the ST module stores the service interval in the service interval data store 42d (FIG. 2). In a next step 24, each resettable timer 42a of ST module 12 advances its timer count value preferably only while the engine is operating at or above minimum speed setting, as described above. Then later, after operating the machine 15 for some time, in a next step 26 the ST module 12 issues a service warning for the task based on comparing the service interval for the task and the accumulated machine operating time since the task was last performed, as indicated by the associated resettable timer 42a (FIG. 2). In a next step 28, the operator performs the associated maintenance service task. Then, depending on whether the timer for the task performed is resettable at the ST module 12, the operator either directly resets the timer in a next step 30, or instead provides a timer reset command via the user interface 14b of the maintenance module 14, and then, in a next step 35, the MM module 14 provides a corresponding timer reset signal to the ST module 12, and in particular, to the controller 12e, which then resets the resettable timer 42a associated with the task indicated as part of the timer reset command.

It should be noted that the invention has the great value of making possible retrofitting equipment provided originally without any computer-based service tracking, and thus providing such tracking for such equipment. The service tracking module 12 of the invention is able to be attached to essentially any piece of equipment, since the coupling to the equipment (to sense either simply the on/off state of the equipment or the speed of operation of its engine) is a simply electrical connection, and the service tracking module 12 can be mechanically attached using a de minimis attaching means, even e.g. using velcro or glue. Thus, the service tracking module 12 of the invention is generic to all equipment, i.e. it is not adapted to any particular piece of equipment and does not rely on the equipment having any particular components except, of course, an engine or motor assembly including some basis for the service tracker to obtain a machine operating status signal.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A service tracking system (10) for use with a machine (15) having an engine or motor assembly (18), the service tracking system (10) for warning when a maintenance procedure for a service maintenance task is to be performed, comprising:
    a maintenance manager (14), responsive to a service interval setting command, for providing a corresponding service interval setting signal indicating a service interval for the service maintenance task; and
    a service tracker (12), retrofittably attached to the machine (15), responsive to the service interval setting signal, and further responsive to a machine operating status signal provided by a coupling to the engine or motor assembly (18), for issuing a service warning urging that the service maintenance task be performed as soon as possible, wherein the service tracker (12) includes a resettable timer (42a) having a timer count value indicating a timer reading useable for determining when to issue the service warning, and the service tracker (12) is responsive to a timer reset signal for resetting the resettable timer so as to allow comparing the resettable timer reading with the service interval; and
    a non-resetting total timer (40) adapted to advance whenever the resettable timer (42a) advances and providing a total timer reading, and further wherein the resettable timer is reset to the total timer reading in response to the timer reset signal at the time the reset signal is received so as to allow comparing the resettable timer reading at a current time with the service interval after subtracting the resettable timer reading from the total timer reading at the current time.

2. The service tracking system (10) of claim 1, wherein the maintenance manager (14) and service tracker (12) are coupled by a wireless link (12a 14a 16).

3. The service tracking system (10) of claim 2, wherein the wireless link (12a 14a 16) conveys an infrared signal.

4. The service tracking system (10) of claim 2, wherein the wireless link (12a 14a 16) conveys a radio frequency signal.

5. The service tracking system (10) of claim 1, wherein the maintenance manager (14) is hosted by a hand-held device.

6. The service tracking system (10) of claim 5, wherein the hand-held device is a personal digital assistant type of device.

7. The service tracking system (10) of claim 1, wherein the machine operating status signal conveys information indicating whether a component of the engine or motor assembly (18) is on, and the service tracker module (12) is adapted so that the resettable timer (42a) advances its timer count value whenever the component of the engine or motor assembly (18) is indicated as being on.

8. The service tracking system (10) of claim 1, wherein the maintenance manager (14) is responsive to a timer reset command corresponding to the timer reset signal provided via a user interface (14b), and provides the corresponding timer reset signal.

9. The service tracking system (10) of claim 1, wherein the service tracker (12) comprises a direct timer reset means (12c), responsive to a direct timer reset command, for providing the timer reset signal.

10. The service tracking system (10) of claim 1, wherein the service tracker (12) comprises a data store (12b) for storing a log of maintenance service.

11. The service tracking system (10) of claim 10, wherein the maintenance manager (14) includes means for responding to a request for providing the log of maintenance service provided via a user interface (14b) and for providing a corresponding request to the service tracker (12), and for responding to a signal from the service tracker conveying the maintenance log and for then providing the maintenance log.

12. The service tracking system (10) of claim 11, wherein the maintenance manager (14) provides the maintenance log so as to be downloadable to a personal computer database.

13. The service tracking system (10) of claim 1, wherein the service tracker (12) includes a display (12d) for indicating all or part of the service warning.

14. The service tracking system (10) of claim 13, wherein the service tracker (12) provides at least two service warning signals simultaneously, corresponding to at least two service interval settings, and further alternately displays on the display (12d) at least two service warning code numbers, said at least two warning code numbers corresponding to the at least two service warning signals.

15. A service tracking system (10) for use with a machine (15) having an engine or motor assembly (18), the service tracking system (10) for warning when a maintenance procedure for a service maintenance task is to be performed, comprising:

a maintenance manager (14), responsive to a service interval setting command, for providing a corresponding service interval setting signal indicating a service interval for the service maintenance task; and a service tracker (12), retrofittably attached to the machine (15), responsive to the service interval setting signal, and further responsive to a machine operating status signal provided by a coupling to the engine or motor assembly (18), for issuing a service warning urging that the service maintenance task be performed as soon as possible, wherein the service tracker (12) includes a resettable timer (42a) having a timer count value indicating a timer reading useable for determining when to issue the service warning, and the service tracker (12) is responsive to a timer reset signal for resetting the resettable timer so as to allow comparing the resettable timer reading with the service interval, a non-resetting total timer (40) adapted to advance whenever the resettable timer (42a) advances and providing a total timer reading, and further wherein the resettable timer is reset to the total timer reading in response to the timer reset signal at the time the reset signal is received so as to allow comparing the resettable timer reading at a current time with the service interval after subtracting the resettable timer reading from the total timer reading at the current time, and further wherein the machine operating status signal conveys information about the speed of operation of a component of the engine or motor assembly (18), and the service tracker module (12) is adapted so that the resettable timer (42a) advances its timer count value only when the speed of operation is at least a predetermined minimum speed setting.

16. The service tracking system (10) of claim 15, wherein the maintenance manager (14) and service tracker (12) are coupled by a wireless link (12a 14a 16).

17. The service tracking system (10) of claim 16, wherein the wireless link (12a 14a 16) conveys an infrared signal or radio frequency signal.

18. The service tracking system (10) of claim 15, wherein the maintenance manager (14) is hosted by a hand-held device, wherein optionally the hand-held device is a personal digital assistant type of device.

19. The service tracking system (10) of claim 15, wherein the maintenance manager (14) is responsive to a timer reset command corresponding to the timer reset signal provided via a user interface (14b), and provides the corresponding timer reset signal.

20. The service tracking system (10) of claim 15, wherein the service tracker (12) comprises a direct timer reset means (12c) responsive to a direct timer reset command, for providing the timer reset signal.

21. The service tracking system (10) of claim 15, wherein the service tracker (12) comprises a data store (12b) for storing a log of maintenance service.

22. The service tracking system (10) of claim 21, wherein the maintenance manager (14) includes means for responding to a request for providing the log of maintenance service provided via a user interface (14b) and for providing a corresponding request to the service tracker (12), and for responding to a signal from the service tracker conveying the maintenance log and for then providing the maintenance log.

23. The service tracking system (10) of claim 22, wherein the maintenance manager (14) provides the maintenance log so as to be downloadable to a personal computer database.

24. The service tracking system (10) of claim 15, wherein the service tracker (12) includes a display (12d) for indicating all or part of the service warning.

25. The service tracking system (10) of claim 24, wherein the service tracker (12) provides at least two service warning signals simultaneously, corresponding to at least two service interval settings, and further alternately displays on the display (12d) at least two service warning code numbers, said at least two warning code numbers corresponding to the at least two service warning signals.

* * * * *